United States Patent [19]  [11] 4,013,701
Jabs et al.  [45] Mar. 22, 1977

[54] PROCESS FOR THE PRODUCTION OF POLYISOCYANATES

[75] Inventors: Gert Jabs, Cologne; Günther Loew, Leichlingen, both of Germany

[73] Assignee: Bayer Aktiengesellschaft, Leverkusen, Germany

[22] Filed: May 8, 1975

[21] Appl. No.: 575,849

[30] Foreign Application Priority Data

May 22, 1974 Germany .......................... 2441843

[52] U.S. Cl. ..................... 260/453 AR; 260/2.5 A; 260/2.5 AT; 260/2.5 AD; 260/248 NS; 260/389; 260/453 A; 260/453 AL; 260/453 AM; 260/453 AB; 260/470; 260/471 C

[51] Int. Cl.$^2$ .......... C07C 119/042; C07C 119/045; C07C 119/048

[58] Field of Search ... 260/453 P, 453 AR, 453 AL, 260/453 A, 453 AM

[56] References Cited

UNITED STATES PATENTS 3,826,769   7/1974   Carlson ...................... 260/29.2 TN

*Primary Examiner*—Dolph H. Torrence
*Attorney, Agent, or Firm*—Gene Harsh; Joseph C. Gil

[57] ABSTRACT

The instant invention relates to a process for producing modified polyisocyanates suitable for the production of hydrophilic foams, wherein an organic polyisocyanate is heat treated with a water-containing, organic sulphonic acid at a specified molar ratio and for a specified time. The invention further relates to the use of such modified polyisocyanates in producing a hydrophilic polyurethane foam.

8 Claims, No Drawings

PROCESS FOR THE PRODUCTION OF POLYISOCYANATES

The instant invention relates to a process for producing modified polyisocyanates suitable for the production of hydrophilic foams, wherein an organic polyisocyanate is heat treated with a water-containing, organic sulphonic acid at a specified molar ratio and for a specified time. The invention further relates to the use of such modified polyisocyanates in producing a hydrophilic polyurethane foam,

BACKGROUND OF THE INVENTION

It has been proposed to use polyhydroxyl polyethers with a high ethylene oxide content for producing polyurethane foams and/or to add suitable fillers to the reaction mixture (German Offenlegungsschrift No. 1,127,040). Certain substances which increase the hydrophilic character of the polyurethane foams have also been added to the reaction mixture in order to obtain a foam which may be wetted with water (German Offenlegungsschrift Nos. 1,694,027 or 1,694,028).

Although the methods described above result in a foam which may be wetted with water, the other mechanical properties of the foam are thereby deleteriously affected, in particular the tensile strength and elongation at break. In addition, these foams frequently swell in water. Moreover, the salt compounds which render the foams hydrophilic are relatively easily washed out of the foams so that the water absorption capacity of the foams decreases.

It is important to note that no hydrophilic agents are presently known which may be used for both soft and hard polyurethane foams. Although processes are known by which open-celled hydrophilic polyurethane hard foams may be produced, these processes are inapplicable to soft polyurethane foams, and vice versa.

The process discovered according to the present invention enables the disadvantages described above to be overcome.

DESCRIPTION OF THE INVENTION

It has surprisingly been found that readily wettable polyurethane foams may be obtained by reacting the usual polyhydroxyl compounds with polyisocyanates which have been reacted in a certain manner with certain water-containing sulphonic acids, in the presence of the auxiliaries and additives normally used in the production of polyurethane foams.

The instant invention further relates to a process for producing modified polyisocyanates suitable for the production of hydrophilic foams, wherein organic polyisocyanates are heat-treated at from 40° to 90° C with organic sulphonic acids containing from 0.1 to 5% by weight of water in an NCO/SO$_3$H molar ratio of from 100:0.1 to 100:50 until from 50 to 100% of the quantity of carbon dioxide theoretically expected from reaction of the water with the isocyanate groups has escaped from the reaction mixture.

The invention also relates to the use of these modified polyisocyanates as the isocyanate component in the production of hydrophilic polyurethane foams by the isocyanate polyaddition process.

The organic sulphonic acids used for producing the modified polyisocyanates of the instant invention are preferably sulphonic acids corresponding to the formula:

wherein
- $n$ represents the integer 1 or 2, preferably 1; and
- R represents an aromatic hydrocarbon radical containing 6 – 14 carbon atoms, an aliphatic hydrocarbon radical containing 10 – 18 carbon atoms, a cycloaliphatic hydrocarbon radical with 6 – 15 carbon atoms, an araliphatic hydrocarbon radical containing 7 – 15 carbon atoms or an alkaromatic hydrocarbon radical with 7 – 24 carbon atoms. The latter two species (i.e. araliphatic and alkaromatic) of R are presently preferred.

Sulphonic acids corresponding to the above general formula wherein R represents an alkyl-substituted phenyl group with a total of 12 – 14 carbons are particularly preferred. Sulphonic acids corresponding to the above general formula, wherein R has the meaning indicated above and in addition contains inert substituents, such as halogen or nitro groups, may also be used for carrying out the modification of polyisocyanates in accordance with the instant invention.

Specific examples of suitable sulphonic acids include decane sulphonic acid, octadecane sulphonic acid, benzene sulphonic acid, toluene sulphonic acid, naphthalene sulphonic acid, di-sec-butyl-naphthalene sulphonic acid, cyclohexyl sulphonic acid, 1,6-naphthalene-disulphonic acid, chlorobenzenesulphonic acid, phenyl methane sulphonic acid, phenyl butane sulphonic acid, and, in particular, aromatic monosulphonic acids, such as may be obtained in conventional manner by sulphonating alkyl benzenes, such as hexyl benzene, dodecyl benzene or octadecyl benzene.

In the process according to the invention the sulphonic acids mentioned are used in a form in which they contain from 0.1 to 5, preferably from 0.2 to 2% by weight of water. The water content of the sulphonic acid may be determined by Mitchell & Smith's method "Aquimetrie", Interscience 1948, page 105, et seq (water determination according to K. Fischer).

The modified polyisocyanates may be prepared from essentially any organic polyisocyanate, including aliphatic, cycloaliphatic, araliphatic, aromatic or heterocyclic polyisocyanates of the type described, for example, by W. Siefken in Justus Leibigs Annalen der Chemie, 562 pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-5-isocyanatomethyl-cyclohexane (German Auslegeschrift No. 1,202,785); 2,4- and 2,6- hexahydrotolylene diisocyanate, and mixtures of these isomers; hexahydro-1,3- and/or 1,4-phenylene diisocyanate; perhydro-4,4'- and/or diphenylmethane diisocyanate; 1,3 and 1,4-phenylene diisocyanate; 2,4- and 2,6-tolylene diisocyanate, and mixtures of these isomers; diphenylmethane 2,4'- and/or 4,4'-diisocyanate; naphthylene-1,5-diisocyanate; triphenylmethane-4,4',4''-triisocyanate; polyphenyl polymethylene polyisocyanates of the type obtained by condensing aniline with formaldehyde followed by phosgenation and as described, for example, in British Patent Nos. 874,430 and 848,671; perchlorinated arylpolyisocyanates of the type described, for example, in German Auslegeschrift No. 1,157,601; polyisocyanates containing carbodiimide groups of the type described in German Patent No. 1,092,007; diisocyanates of the type described in U.S. Pat. No. 3,492,330; polyisocyanates containing allophanate groups of the type described, for example, in British Patent No. 994,890, Belgian Patent No. 761,626 and published Dutch Patent Application No. 7,102,524; polyisocyanates containing isocyanurate groups of the type described, for example, in German Patent Nos. 1,022,789, 1,222,067 and 1,027,394 and in German Offenlegungsschrift Nos. 1,929,034 and 2,004,048; polyisocyanates containing urethane groups of the type described, for example in Belgian Patent No. 752,261 or in U.S. Pat. No. 3,394,164; polyisocyanates containing acylated urea groups as described in German Patent No. 1,230,778; polyisocyanates containing biuret groups of the type described, for example, in German Patent No. 1,101,394, British Patent 889,050 and French Patent No. 7,017,514; polyisocyanates produced by telomerization reactions of the type described for example, in Belgian Patent No. 723,640; polyisocyanates containing ester groups of the type described, for example, in British Patent Nos. 956,474 and 1,072,956, U.S. Pat. No. 3,567,763 and German Patent No. 1,231,688; reaction products of the aforementioned isocyanates with acetals as described in German Patent No. 1,072,385.

It is also possible to use the distillation residues containing isocyanate groups accumulating in the commercial production of isocyanates, optionally dissolved in one or more of the aforementioned polyisocyanates. It is also possible to use mixtures of the aforementioned polyisocyanates.

Generally, it is preferred to use readily accessible polyisocyanates such as 2,4- and 2,6-tolylene diisocyanate and any mixtures of these isomers ("TDI"); polyphenyl polymethylene polyisocyanates, of the type obtained by aniline-formaldehyde condensation and subsequent phosgenation ("crude MDI"); and, polyisocyanates containing carbodiimide groups, urethane groups, allophanate groups, isocyanurate groups, urea groups or biuret groups ("modified polyisocyanates"). The tolylene diisocyanates and polyphenyl polymethylene polyisocyanates are particularly preferred as well as NCO-prepolymers obtained by reacting monomeric diisocyanates such as 2,4-diisocyanato toluene with higher molecular weight polyhydroxyl compounds of the type exemplified hereinafter at a molar NCO/OH ratio of greater than 1.5:1.

The polyisocyanates are reacted with the water-containing sulphonic acids. In the process of the instant invention, the sulphonic acids are used in such quantities that for 100 mol of isocyanate groups, there after from 0.1 to 50, preferably from 0.5 to 10 mol, of sulphonic acid groups. After the components to be used in the process according to the invention have been combined, the mixture is heated at a temperature of from 40° to 90° C, preferably from 40° to 60° C, until from 50 to 100%; preferably from 90 to 100% of the carbondioxide theoretically expected from the reaction of the entire quantity of water has escaped.

It is preferred to use commercial-grade sulphonic acids which have a water content of from 0.1 to 5% preferably from 0.2 to 2% by weight, in the process according to the invention. The water present then reacts within the isocyanates in known manner, accompanied by the evolution of carbon dioxide, to form the corresponding amines, which are then neutralized in the presence of the sulphonic acids, and converted into the corresponding ammonium sulphonates, so that in addition to free isocyanate and sulphonic acid groups, the end products by the process according to the invention also contains ammonium groups.

It desired, it is also possible in the process according to the invention to control the reaction yielding ammonium salts by the controlled addition of water to the sulphonic acid to be used. In this way, it is possible to vary the ratio of sulphonic acid groups to ammonium groups preferably from 100 : 1 to 100 : 50 in the excess polyisocyanate.

As a general rule, starting compounds that are liquid at room temperature are used in the process according to the invention. However, it is also possible to add sulphonic acids in powder form to the polyisocyanate. For the reaction, solid polyisocyanates, when used, have to be introduced in an inert solvent, such as chlorobenzene, toluene or the like. After the reaction, the solvent is distilled off in vacuo to isolate the "modified" polyisocyanate.

The polyisocyanates modified in accordance with the invention are valuable starting materials for the production of hydrophilic foams.

Reagents for the modified polyisocyanates in the production of hydrophilic foams in accordance with the invention are compounds well known in polyurethane chemistry which contain at least two hydrogen atoms capable of reacting with isocyanates and which generally have a molecular weight of from 62 to 10,000.

Such active hydrogen-containing compounds include compounds containing amino groups, thiol groups, carboxyl groups, and hydroxyl groups. The preferred compounds are polyhydroxyl compounds and in particular compounds which contain 2 to 8 hydroxyl groups. Especially preferred are those with a molecular weight of from 50 to 10,000, with molecular weights of from 1000 to 6000 most preferred. Specific examples include polyhydric alcohols, polyesters, polyethers, polythioethers, polyacetals, polycarbonates or polyester amides containing at least two and generally from 2 to 8 and preferably from 2 to 4 hydroxyl groups, of the type commonly used in the production of homogeneous and cellular polyurethanes.

Examples of suitable polyhydric alcohols include ethylene glycol 1,2-propylene glycol 1,4-butane diol 1,6-hexane diol glycerol, trimethylol propane, erythritol, pentaerythritol, sorbital, sucrose and the like.

Examples of suitable polyesters containing hydroxyl groups include reaction products of polyhydric, preferably dihydric and optionally trihydric alcohols, with polyvalent, preferable divalent, carboxylic acids. Instead of the free polycarboxylic acids, the corresponding polycarboxylic acid anhydrides or esters of lower alcohols or mixtures thereof may also be used for the production of the polyesters. The polycarboxylic acids may be aliphatic, cycloaliphatic, aromatic and/or heterocyclic, and may optionally be substituted, for example, by halogen atoms, and/or they may be unsaturated. Examples of these polycarboxylic acids are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorphthalic acid anhydride, endomethylene tetrahydrophthalic acid anhydride, glutaric acid anhydride, maleic acid, maleic anhydride, fumaric acid, dimeric and trimeric fatty acids, such as oleic acid, optionally in admixture with monomeric fatty acids, terephthalic acid dimethyl ester, terephthalic acid-bis-glycol ester. Examples of suitable polyhydric alcohols include ethylene glycol 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl-cyclohexane), 2-methyl-1,3-propane diol, glycerol, trimethylol-propane, 1,2,6-hexane triol, 1,2,4-butane triol, trimethylolethane, pentaerythritol, quinitol, mannitol, sorbitol, methyl glycoside, diethylene glycol, triethylene gylcol, tetraethylene glycol, polyethylene glycols, dipropylene glycol, polypropylene glycols, dibutylene glycol and polybutylene glycols. The polyesters may contain terminal carboxyl groups. Polyesters for lactones, for example, $\epsilon$-caprolactone, or hydroxycarboxylic acids, for example, $\omega$-hydroxycaproic acid, may be used.

The polyethers suitable for use in accordance with the invention, are also those of the type known and may be obtained, for example, by the polymerization of epoxides, such as ethylene oxide, propylene oxide, butylene oxide, tetrahydrofuran, styrene oxide or epichlorhydrin for example, in the presence of $BE_3$, or by the chemical addition of these epoxides, optionally in admixture with starter components with reactive hydrogen atoms such as water, ethylene glycol, 1,3- or 1,2-propylene glycol, trimethylolpropane, 4,4'-dihydroxydiphenylpropane, aniline, ammonia, ethanolamine and ethylene diamine. Sucrose polyethers of the type described in German Auslegeschrift 1,176,358 and 1,064,938 are also suitable for the purpose of the invention. In many cases, it is preferred to use polyethers of the type which predominantly contain primary OH-groups (up to 90% by weight based on all the OH-groups present in the polyether). Graft polyethers obtained, for example, by the polymerization of styrene and acrylonitrile in the presence of polyethers (U.S. Pat. Nos. 3,383,351; 3,304,273; 3,523,093 and 3,110,695 and German Patent No. 1,152,536) are also suitable, as are polybutadienes containing OH-groups.

Among the polythio-ethers suitable for use include the condensation products of thiodiglycol with itself and/or with other glycols, dicarboxylic acids, formaldehyde, aminocarboxylic acids or aminoalcohols. Depending on the co-components, these products are polythio-mixed-ethers, polythio-ether-esters or polythio-ether-ester-amides.

Suitable polyacetals include those compounds which may be obtained from glycols, such as diethylene glycol, triethylene glycol, 4,4'-dioxethoxy diphenyl-dimethylmethane and hexane diol, and formaldehyde. Polyacetals suitable for the purpose of the invention may also be obtained by polymerizing cyclic acetals.

Suitable polycarbonates containing hydroxyl groups are known and include those obtained by reacting diols, such as 1,3-propane diol, 1,4-butane diol and/or 1,6-hexane diol, diethylene glycol, triethylene glycol and tetraethylene glycol, with diarylcarbonates, such as diphenylcarbonate, or phosgene.

Examples of polyester amides and polyamides include the predominatly linear condensates obtained from polyvalent saturated and unsaturated carboxylic acids or their anhydrides and polyhydric saturated and unsaturated amino alcohols, diamines, polyamines and mixtures thereof.

Polyhydroxyl compounds already containing urethane or urea groups, and modified natural polyols, such as caster oil, carbohydrates and starch, may also be used. The addition products of alkylene oxides with phenol-formaldehyde resins or even with urea-formaldehyde resins may also be used in accordance with the invention.

Representatives of the many types of compounds suitable for use in accordance with the invention are described, for example, in High Polymers, Vol. XVI, "Polyurethanes, Chemistry and Technology", by Saunders-Frisch, Interscience Publishers, New York, London Vol. I, 1962, pages 32 to 42 and pages 44 to 54, and Vol. II, 1964, pages 5 to 6 and 198 to 199, and in Kunststoff-Handbuch, Vol. VII. Vieweg-Hochtlen, Carl-Hanser-Verlag, Munich, 1966, pages 45 to 71.

According to the invention, water and/or readily volatile organic substances are often jointly used as blowing agents. Suitable organic blowing agents include acetone; ethyl acetate; methanol; ethanol; halogen-substituted alkanes; such as methylene chloride, chloroform, ethylidene chloride, vinylidene chloride, monofluorotrichloromethane, chlorodifluoromethane, and dichlorodifluoromethane; butane; hexane; heptane; and diethylethane. The blowing effect may also be obtained by adding compounds which decompose spontaneously at temperatures above room temperature, giving off gases (such as nitrogen). Examples of such compounds include azo compounds, such as azoisobutyronitrile. Further examples of blowing agents and details of the use of blowing agents may be found in Kunststoff-Handbuch, Vol. VII published by Vieweg and Hochtlen, Carl-Hanser-Verlag, Munich, 1966, on pages 108 to 109, 453 to 455 and 507 to 510.

According to the invention, catalysts are also frequently used to produce the polyurethane foam. Examples of suitable catalysts include tertiary amines, such as triethylamine, tributylamine, N-methylmorpholine, N-ethylmorpholine, N-cocomorpholine, N,N,N',N'-tetramethylethylene diamine, 1,4-diazabicyclo-(2,2,2)-octane N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine N,N-dimethyl-$\beta$-phenylethylamine, 1,2-dimethylimidazole and 2-methylimidazole.

Tertiary amines containing hydrogen atoms capable of reacting with isocyanate groups may also be used and include triethanolamine, triisopropanolamine, N-methyldiethanolamine N-ethyldiethanolamine, N,N-dimethylethanolamine, and their reaction products with alkylene oxides, such as propylene oxide and/or ethylene oxide.

Other suitable catalysts include silaamines with carbon-silicon bonds of the type described for example, in German Patent No. 1,229,290. Specific examples include 2,2,4-trimethyl-2-silamorpholine and 1,3-diethylaminomethyltetramethyl disiloxane.

Nitrogen-containing bases, such as tetraalkylammonium hydroxides; alkali hydroxides, such as sodium hydroxide; alkali phenolates, such as sodium phenolate; alkali alcoholates, such as sodium methylene; or hexahydrotriazines may also be used as catalysts.

Organometallic compounds, and particularly organotin compounds, may also be used as catalysts. Preferred organotin compounds include tin-(II)-salts or carboxylic acids, such as tin-(II)-acetate, tin-(II)-octane,tin-(II)-ethylhexoate and tin-(II)-laurate; and, the dialkyl tin salts of carboxylic acids, such as dibutyl tin diacetate, dibutyl tin dilaurate, dibutyl tin maleate or dioctyl tin diacetate.

Further representatives of catalysts suitable for use in accordance with the invention and detailed in the way in which they work may be found in Kunststoff-Handbuch Vol. VII, published by Vieweg and Hochtlen, Carl-Hanser-Verlag, Munich, 1966, pages 96 to 102.

The catalysts, when used, are generally present in quantities of from about 0.001 to 10% by weight based on the quantity of compounds containing at least two hydrogen atoms capable of reaction with isocyanates and having a molecular weight of from 400 to 10,000.

Surface-active additives (emulsifiers and foam stabilizers) may also be used in producing the foams herein. Examples of emulsifiers include the sodium salts of castor oil sulphonates or fatty acids, or salts of fatty acids with amines, such as diethylamine/oleic acid or diethanolamine/stearic acid. Alkali or ammonium salts of sulphonic acids, such as those of dodecylbenzene sulphonic acid or dinaphthylmethane disulphonic acid or of fatty acids, such as ricinoleic acid, or of polymeric fatty acids may also be used as surface-active additives.

Suitable foam stabilizers include water-soluble polyether siloxanes. These compounds are generally of such structure that a copolymer of ethylene oxide and propylene oxide is attached to a polydimethylsiloxane radical. Foam stabilizers of this type are described, for example, in U.S. Pat. No. 3,201,372, column 3, line 60 to column 4, line 3.

In producing the foams herein, it is possible to use reaction retarders such as hydrochloric acid or organic acid halides and/or anhydrides; cell regulators such as paraffins or fatty alcohols or dimethyl polysiloxanes; pigments or dyes; flameproofing agents such as trischloroethyl phosphate or ammonium phosphate and polyphosphate; stabilizers against the effects of ageing and weather; plasticizers; substances with fungistatic and bacteriostatic effects; and fillers, such as barium sulphate, kieselguhr, carbon black or prepared chalk.

Further examples of the surface-active additives and foam stabilizers optionally used in accordance with the invention, and of all regulators, reaction retarders, stabilizers, flameproofing agents, plasticizers, dyes, fillers, substances with fungistatic and bacteriostatic effects, and also details on the way in which these additives are to be used and how they work may be found in Kunststoff-Handbuch Vol. VI, published by Vieweg and Hochtlen, Carl-Hanser-Verlag, Munich, 1966, pages 103 to 113.

The foams herein are generally produced by reacting the components by the single-stage process, by the prepolymer process, or by the semi-prepolymer process. In many cases machines of the type described, or example in U.S. Pat. No. 2,764,565 are used. Particulars of processing equipment suitable for use in accordance with the invention may be found, for example, on pages 121 and 205 of Kunststoff-Handbuch Vol VI, published by Vieweg and Hochtlen, Carl-Hanser-Verlag, Munich, 1966.

The process according to the invention differs from conventional process for the production of hard, semi-hard and soft polyurethane foams solely in the use of the modified polyisocynates according to the invention. The reduction in NCO functionality brought about by the modifications of the polyisocyantes used in accordance with the invention can readily be compensated by a corresponding increase in the functionality of the reagents. In practice, the reduction in NCO functionality has hardly any effect.

The foams produced using the modified polyisocyanates of the instant invention have the following applications for example: hydrophilic, elastic polyurethane foams such as sponges, particularly if they are given the appearance of a natural sponge with the aid of pore regulators; when made up into sheets, waterabsorbent elastic polyurethane foams based on polyhydroxyl polyesters may be used as dishcloths for domestic purposes by virtue of their high tensile strength in compressed or uncompressed form; as subsoil irrigation webs or as leather substitutes or filter cloths; hydrophilic, open-celled hard foams may be used, for example, as substrates for the soil-free cultivation and growing of plants, and as holders for cut flower arrangements.

Examples 1–5 below illustrate the production of the modified polyisocyanates according to the invention while the subsequent Examples serve to describe the production of the hydrophilic foams. All parts by weight in the Examples represent grams.

EXAMPLE 1

5 parts by weight of dodecyl benzenesulphonic acid (water content 0.5% by weight) are added dropwise to 100 parts by weight of an isomeric mixture of tolylene 2,4- and -2,6-diisocyanate (ratio by weight 65:35) at 60° C with stirring. The reaction mixture is then maintained at 60° C for 30 minutes. 30 ml. of carbon dioxide (95% of the carbon dioxide to be expected from the reaction of the entire amount of water) was evolved in the course of the reaction. The resulting polyisocyanate solution had an isocyanate content of 46.5% (theoretical NCO content 45.5) and is referred to in the following Examples as "modified polyisocyanate A".

EXAMPLE 2

6 parts by weight of dodecyl benzenesulphonic acid (water content 0.5% by weight) were added dropwise to 100 parts by weight of an isomeric mixture consisting of tolylene 2,4- and -2,6-diisocyanate (ratio by weight 80:20) at 60° C for 30 minutes. 35 ml. (93% of the carbon dioxide expected from the reaction of the entire amount of water) was evolved in the course of the reaction. The resulting polyisocyanate had an isocyanate content of 45.0% by weight (theoretical NCO content 44.6) and is referred to in the following Examples as "modified polyisocyanate B".

EXAMPLE 3

10 parts by weight of dodecyl benzenesulphonic acid (water content 0.5% by weight) were added dropwise at 60° C with stirring to 110 parts by weight of a polyphenyl polymethylene polyisocyanate, produced by aniline-formaldehyde condensation and subsequent phosgenation (31% NCO content). The mixture was then kept at 60° C for 60 minutes. 61 ml. (98% of the carbon dioxide to be expected from the reaction of the entire amount of water) was evolved during the course of the reaction. A polyisocyanate solution with an isocyanate content of 27.5% was obtained (theoretical content 28.2%) which is referred to in the following Examples as "modified polyisocyanate C".

EXAMPLE 4

10 g. of toluenesulphonic acid (adjusted to a water content of 1% by weight) were added portionwise with stirring at 60° C to 105 parts by weight of a poly-phenyl polymethylene polyisocyanate produced by aniline-formaldehyde condensation and subsequent phosgenation (31% NCO content). On completion of the addition, the reaction mixture was stirred for 90 minutes at 60° C. 120 ml. of carbon dioxide (97% of the carbon dioxide to be expected) was evolved during the course of the reaction. A polyisocyanate with an isocyanate content of 25.5% was obtained (theoretical NCO content of 27.5%) which is referred to in the following Examples as "modified polyisocyanate D".

EXAMPLE 5

4 parts by weight of di-sec.-butyl naphthalene sulphonic acid (water content 10% by weight) were added dropwise at 60° C with stirring to 100 parts by weight of an isomer mixture of tolylene 2,4- and -2,6-diisocyanate (ratio by weight 80:20). The mixture was then heated to 60° C for 60 minutes. 460 ml. (92% of the carbon dioxide to be expected from the reaction of the entire amount of water) was evolved during the course of the reaction. The resulting modified polyisocyanate had an isocyanate content of 45.3% by weight (theoretical NCO content 45.8% and is referred to in the following Examples as "modified polyisocyanate E".

EXAMPLE 6

100 parts by weight of a polyhydroxypolyester (hydroxyl number of 50) of 7.7 mol of adipic acid, 7.9 mol of diethylene glycol and 0.3 mol of trimethylolpropane were mixed with 3 parts by weight of water, 2.0 parts by weight of N-methylmorpholine, 0.5 parts by weight of dodecylbenzene polyglycol ether (7 glycol ether units) and 1 part by weight of a commercial polysiloxane stabilizer ("L 532" of Union Carbide Corporation). The mixture was then mixed with 37.5 parts by weight of the modified polyisocyanate B, produced in accordance with Example 2 (NCO content:45%).

An elastic polyurethane foam with a gross density of 35 kg/m³ was obtained. The water uptake time to measure the water uptake time, the sample block placed on a water surface and the time required for the foam to become completely saturated with water as a result of its wetting capacity is measured of a foam block (10 × 10 × 5 cm) which had been immersed in water and then wrung out was about 5 seconds. The tensile strength determined according to DIN 53 571 was 0.16 MPa and the elongation at break was 350%. These values were found to be unchanged in a foam which had been wetted with water. Moreover, no swelling occurred in the moist state.

EXAMPLE 7

90 parts by weight of a polyhydroxypolyester (hydroxyl number of 60) of 7.5 mol of adipic acid, 7.9 mol of diethylene glycol and 0.4 mol of trimethylolpropane were mixed with 3 parts by weight of water, 0.5 parts by weight of acetic acid anhydride, 1.5 parts by weight of triethanolamine, 2 parts by weight of N,N'-dimethylbenzylamine, 0.5 parts by weight of dodecyl benzene polyglycol ether (7 glycol ether units) and 1 part by weight of a commercial stabilizer ("L 532" of Union Carbide Corporation). The mixture was then mixed with 42 parts by weight of the modified polyisocyanate A, produced in accordance with Example 1 (NCO-content 46.5).

An elastic polyurethane foam with a gross density of 35 kg/m³ was obtained. The water uptake time of a foam block (10 × 10 × 5 cm) which had been immersed in water and then wrung out was about 2 seconds. The tensile strength of the foam determined according to DIN 53 571 was 0.18 MPa, the elongation at break was 240%. Both values were found to be unchanged in the moist state and no swelling occurred in the moist state.

EXAMPLE 8

25 parts by weight of a polyether of 1 mol ethylenediamine and 5 mol of propylene oxide, 20 parts by weight of a polyether of trimethylolpropane and ethylene oxide/propylene oxide in a ratio of 2:1 (OH No. 614). 18 parts by weight of glycerol, 10 parts by weight of a polyether of glycerol and a mixture of propylene oxide 55 mol %) and ethylene oxide (45 mol %) (OH number 56), 5 parts by weight of a polyester of 7.5 mol of adipic acid, 7.9 mol of diethylene glycol and 0.4 mol of trimethylolpropane (OH No. 60), 7 parts by weight of water and 4 parts by weight of a commercial polysiloxane polyether ("L 5310" of Union Carbide Corporation) were mixed together. The mixture was then mixed with 122 parts by weight of the modified polyisocyanate C, produced in accordance with Example 3 (NCO content 27.5%).

A hard hydrophilic polyurethane foam with a gross density of 28 kg/m³ was obtained. The water uptake time of a block of 10 × 10 × 5 cm was 8 minutes for a water uptake of 85% by volume. The water content fell to only 75% by volume after 24 hours' storage, which shows the good water retention of the foam.

EXAMPLE 9

25 parts by weight of a polyether of 1 mol ethylenediamine and 5 mol of propylene oxide, 20 parts by weight of a polyether of trimethylolpropane and ethylene oxide/propylene oxide in the ratio of 2:1 (OH No. 614), 10 parts by weight of glycerol, 12 parts by weight of a polyether of glycerol and a mixture of propylene oxide (55 mol %) and ethylene oxide (5 mol %) (OH number 56), 7 parts by weight of water and 1.5 parts by weight of a commercial polysiloxane polyether ("L 5310" of Union Carbide Corporation) were mixed together. The resulting mixture was then mixed with 115 parts by weight of modified polyisocyanate D, produced in accordance with Example 4 (NCO content:25.5%).

A hard, hydrophilic polyurethane foam with a gross density of 25 kg/m³ was obtained. The water uptake time of a 10 × 10 × 5 cm foam block was 6 minutes for a water uptake of 87% by volume. The water content fell to only 78% by volume after 24 hours' storage. The compression strength according to DIN 53 421 determined on water-saturated foams was 0.075 MPa.

EXAMPLE 10

100 parts by weight of a polyhydroxy polyester of 5 mol of adipic acid, 5.2 mol of diethylene glycol and 0.2 mol of trimethylolpropane (OH number 50) were mixed with 3 parts by weight of water, 2.0 parts by weight of N-methylmorpholine, 0.5 parts by weight of dodecyl benzene polyglycolether (7 glycolether units) and 1 part by weight of a commercial polysiloxane stabilizer ("L 532" of Union Carbide Corporation). Thereafter the mixture was mixed with 49 parts by weight of "modified polyisocyanate E", produced in accordance with Example 5 (NCO 45.3%). An elastic polyurethane foam with a gross density of 35 kg/m³ was obtained. The water uptake time of a foam block (10 × 10 × 5 cm) was 10 seconds after the foam had been immersed in water and wrung out. The tensile strength of the foam determined in accordance with DIN 53 571 was 0.20 MPa, elongation at break was 300%. Both values were unchanged in the moist state. Moreover, no swelling occurred when the foam was saturated with water.

EXAMPLE 11

Following example shows the modification according to the invention of a polyisocyanate which contains urethane groups.

600 parts by weight of polyether prepared by alkoxylation of glycerol with a mixture of ethylene oxide and propylene oxide (mol ratio 3:2) having an OH-number of 28 are added dropwise at 60° C to 308 parts by weight of a mixture consisting of 80% of 2,4-diisocyanato toluene and 20% of 2,6-diisocyanato toluene. After the reaction between polyisocyanate and polyether polyol has come to an end 27,25 parts by weight of dodecylbenzene sulphonic acid having a water content of 0,5% by weight are added dropwise at 60° C under stirring. The mixture is subsequently heated for 30 **minutes to 60° C. 160 ml of carbon dioxide are formed. This corresponds to 94% of the carbon dioxide which would be formed by reaction of the total quantity of water contained in the acid. The final product obtained had an NCO content of 12.5% by weight and is subsequently called "modified polyisocyanate F".

EXAMPLE 12

Following example shows the preparation of a hydrophilic elastic polyurethane foam following the prepolymer method. 100 parts by weight of modified polyisocyanate F obtained according to example 11 are mixed with 1 part by weight of a polysiloxane stabilizer (L 532 of Union Carbide Corporation). Subsequently 100 parts by weight of water are added under stirring. An elastic polyurethane foam having a dentity of 60 kg/m³ (this refers to the dry foam) is obtained. A sample of this foam 10×10×5 cm in size exhibits a water uptake time of 20 seconds. The tensile strength of the foam according to DIN 53 571 was determined to be 0,19 MPa, the elongation at break was 250%.

What is claimed is:

1. A process for the production of modified polyisocyanates suitable for the production of hydrophilic foams comprising
   a. heating an organic polyisocyanate with an organic sulphonic acid containing from 0.1 to 5 percent by weight of water at a temperature of from 40° to 90° C, the isocyanate group to sulphonic acid group molar ratio being from 100:0.1 to 100:50, and
   b. stopping the heating thereof once 50 to 100 percent of the carbon dioxide theoretically expected from the reaction of the entire amount of the water with the isocyanate groups has evolved from the reaction mixture.

2. The process of claim 1, wherein said organic sulphonic acid is of the general formula $$R(SO_3H)_n$$

wherein
   $n$ represents the integer of 1 or 2; and
   R represents an aromatic hydrocarbon radical containing 6–14 carbon atoms, an aliphatic hydrocarbon radical containing 10–18 carbon atoms, a cycloaliphatic hydrocarbon radical with 6–15 carbon atoms, an araliphatic hydrocarbon radical containing 7–15 carbon atoms or an alkaromatic hydrocarbon radical with 7–24 carbon atoms, and wherein any of said radicals may contain inert substituents.

3. The process of claim 2, wherein the amount of water contained by said sulphonic acid is from 0.2 to 2 percent by weight.

4. The process of claim 2, wherein said molar ratio is from 100:0.5 to 100:10.

5. The process of claim 2, wherein the reactants are heated to from 40° to 60° C.

6. The process of claim 2, wherein heating is stopped once 90 to 100 percent of the carbon dioxide theoretically expected from the reaction has evolved.

7. The process of claim 1 wherein n is 1 and wherein R is araliphatic or alkaromatic.

8. The product of the process of claim 1.

* * * * *